2,841,537

PURIFICATION OF DINITRILES

Pio Guyer and Werner Richarz, Zurich, and Paul Walther, Visp, Switzerland, assignors to Lonza Electric and Chemical Works Ltd., Basel, Switzerland No Drawing. Application June 28, 1957
Serial No. 668,618

Claims priority, application Switzerland June 30, 1956

5 Claims. (Cl. 202—56)

This invention relates to the purification of dinitriles so as to obtain therefrom pure diamines suitable for the manufacture of synthetic polyamides.

In the preparation of such diamines, for instance, adipic diamine and sebacic diamine, by hydrogenation of the dinitriles, it has been found that certain generally present impurities of the nitriles affect the further processing. Such impurities are particularly cyclic imino-cyano compounds and also other by-products which are usually isomers of the dinitriles.

Attempts to remove said cyclic imino-cyano compounds by fractionation have not been successful in view of the small difference of the respective boiling points, and because the iminocyano compounds readily polymerize or decompose and clog the apparatus.

The purification by means of acids and the like has the drawback that specific acid-resistant materials must be used and that the removal of such acids requires lengthy manipulations.

The cyclic iminocyano compounds have generally the same or a lower molecular weight than the corresponding dinitriles, and it had been, therefore, considered impossible to remove by selective absorption the small amounts of such same or lower molecular weight impurities from the bulk of the dinitriles.

We have found that quite unexpectedly in the treatment of crude dinitriles with active carbon the cyclic iminocyano compounds are selectively adsorbed, whereby substantially no dinitrile is lost by adsorption. The thus purified dinitrile may, either after a simple distillation or even without further treatment, be hydrogenated to pure primary diamine. Depending on the amount of impurities, we may use about .3 to 5 percent by weight of active carbon, calculated on the dinitrile.

In order to obtain the required selective adsorption of the described compounds, it is necessary to carry out the purification either at elevated temperatures, preferably at or near the boiling point of the dinitrile, or to use a solvent having a lower boiling point of about 40 to 110° C., such as benzene, toluene, chloroform, and preferably methylene chloride, and heat the solution to or near the boiling point of said solvent. If the dinitrile had been obtained as an aqueous solution or emulsion, it is preferably extracted by such solvent before its treatment with active carbon.

The treatment with active carbon stabilizes also the dinitrile against thermic decomposition. It is therefore possible to omit stabilizers such as acid ammonium phosphate, which has been added to the dinitrile during a heat treatment, for instance for distillation.

The following examples are given to illustrate the method of the invention. All parts are given by weight.

Example 1

1 part of active carbon was added to 99 parts of adiponitrile containing 1.5 percent of 1-cyano-2-iminocyclopentane. The batch was heated, with stirring, for 1 hour at 150–180° C. Subsequently, the active carbon was filtered off and the dinitrile was subjected to a simple vacuum distillation. After a first run of about 1–2%, substantially pure dinitrile was obtained in almost quantitative yields. On hydrogenation of said dinitrile, a very pure diamine was obtained.

Example 2

Crude adipodinitrile, containing about 1 percent of 1-cyano-2-imino-cyclopentane, was mixed with .5 percent of active carbon and directly distilled under reduced pressure. After a small first run, practically pure dinitrile was obtained which was suitable for hydrogenation.

Example 3

Crude sebacodinitrile was mixed with 2 percent of active carbon and heated for 1 hour at 150–180° C. After separation from the active carbon, the purified dinitrile was hydrogenated to pure diamine.

Example 4

The adipodinitrile used in Example 1 was dissolved in 15 percent of methylene chloride and mixed with 1 percent of active carbon, calculated on the dinitrile. The batch was maintained for 1 hour at the boiling temperature of the methylene chloride, subsequently, the active carbon was filtered off, and after distillation of the solvent a pure dinitrile was obtained.

We claim:

1. A method of removing cyclic imino-cyano compounds from dinitriles of adipic acid containing said compounds as impurities, said method comprising adding active carbon to said dinitrile in an amount of about .3 to 5 percent by weight, calculated on the dinitrile, heating the mixture to a temperature not exceeding the boiling point of the dinitrile for a time sufficient to adsorb substantially said cyclic imino-cyano compounds by said active carbon, and separating the purified dinitrile from the active carbon.

2. The method defined in claim 1, wherein said mixture is heated to a temperature of about 150–180° C.

3. The method defined in claim 1, wherein said mixture is heated under reduced pressure to the boiling point of said dinitrile and the dinitrile is distilled off in purified state from said active carbon.

4. The method defined in claim 1, comprising dissolving the dinitrile in an organic solvent boiling between about 40 and 110° C., and heating the mixture of dissolved dinitrile and active carbon at the boiling point of said solvent.

5. The method defined in claim 4, wherein methylene chloride is used as solvent.

References Cited in the file of this patent

UNITED STATES PATENTS

| 2,711,991 | Hrubesch et al. | June 28, 1955 |
| 2,715,138 | Crane | Aug. 9, 1955 |
| 2,803,643 | Halliwell | Aug. 20, 1957 |

FOREIGN PATENTS

| 731,458 | Great Britain | June 8, 1955 |
| 494,132 | Italy | May 17, 1954 |